(12) United States Patent
Green et al.

(10) Patent No.: US 10,393,476 B2
(45) Date of Patent: Aug. 27, 2019

(54) THIRD ARM WEAPON INTERFACE SYSTEM

(71) Applicants: William J. Green, Rose Valley, PA (US); Daniel M. Baechle, Lutherville, MD (US); Zachary K. Wingard, Landenberg, PA (US); Frank Morelli, Bel Air, MD (US); Angela C. Boynton, Street, MD (US)

(72) Inventors: William J. Green, Rose Valley, PA (US); Daniel M. Baechle, Lutherville, MD (US); Zachary K. Wingard, Landenberg, PA (US); Frank Morelli, Bel Air, MD (US); Angela C. Boynton, Street, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/002,420

(22) Filed: Jun. 7, 2018

(65) Prior Publication Data

US 2018/0364004 A1 Dec. 20, 2018

Related U.S. Application Data

(60) Provisional application No. 62/516,692, filed on Jun. 8, 2017.

(51) Int. Cl.
*F41C 33/00* (2006.01)
*F16M 13/04* (2006.01)

(52) U.S. Cl.
CPC ........... *F41C 33/001* (2013.01); *F16M 13/04* (2013.01); *F41C 33/005* (2013.01)

(58) Field of Classification Search
CPC ...... F41C 33/001; F41C 33/005; F41C 33/04; F41C 33/041; F41C 23/12; F16M 13/00; F16M 13/04
See application file for complete search history.

(56) References Cited

U.S. PATENT DOCUMENTS

| | | | | |
|---|---|---|---|---|
| 889,658 | A * | 6/1908 | Burnaugh, Jr. ........ | F41C 33/001 42/94 |
| 2,977,703 | A * | 4/1961 | Sarvis ..................... | F41A 19/07 42/1.11 |
| 3,090,621 | A * | 5/1963 | Heimers ................... | A45F 3/14 224/200 |

(Continued)

*Primary Examiner* — Corey N Skurdal
(74) *Attorney, Agent, or Firm* — Alan I. Kalb

(57) ABSTRACT

A novel wearable apparatus for stabilizing a firearm is described. The "Third Arm" apparatus attaches to a tactical vest on one end, and the rail interface system of the firearm on the other end. The arm allows the user to move the firearm with minimum restrictions while providing complete counterbalancing of the firearm, removing the weight of the firearm from the user's arms, thus reducing arm fatigue and improving accuracy. The apparatus enables the use of unconventional weapons systems including high recoil firearms and skeletonized firearms. Third Arm provides a structure to distribute recoil forces and onto which recoil management systems can be placed to aid in shot consistency and reduce discomfort of recoil forces. The apparatus is adjustable for different sized users and different weight firearms.

20 Claims, 13 Drawing Sheets

(56) References Cited

U.S. PATENT DOCUMENTS

| | | | | |
|---|---|---|---|---|
| 3,138,994 A * | 6/1964 | Blunk | ................. | B64D 7/02 |
| | | | | 224/401 |
| 4,083,480 A * | 4/1978 | Lee | ................. | F16M 13/04 |
| | | | | 224/185 |
| 4,637,536 A * | 1/1987 | Wong | ................. | A45F 5/00 |
| | | | | 224/261 |
| 5,528,846 A * | 6/1996 | Baggett | ................. | F16M 13/04 |
| | | | | 224/913 |
| 6,764,231 B1 * | 7/2004 | Shubert | ................. | F16M 13/04 |
| | | | | 396/419 |
| 8,418,900 B1 * | 4/2013 | Baker | ................. | A45F 5/00 |
| | | | | 224/262 |
| 8,910,410 B2 * | 12/2014 | Peters | ................. | F41C 33/006 |
| | | | | 224/197 |
| 9,282,734 B2 * | 3/2016 | Clary | ................. | A01M 31/025 |
| 9,335,112 B1 * | 5/2016 | Sholley | ................. | F41A 23/06 |
| 9,568,266 B1 * | 2/2017 | LoRocco | ................. | F41A 23/06 |
| 2005/0262753 A1 * | 12/2005 | Lahti | ................. | F41A 23/06 |
| | | | | 42/94 |
| 2015/0075055 A1 * | 3/2015 | Percival | ................. | F41C 33/001 |
| | | | | 42/94 |

* cited by examiner

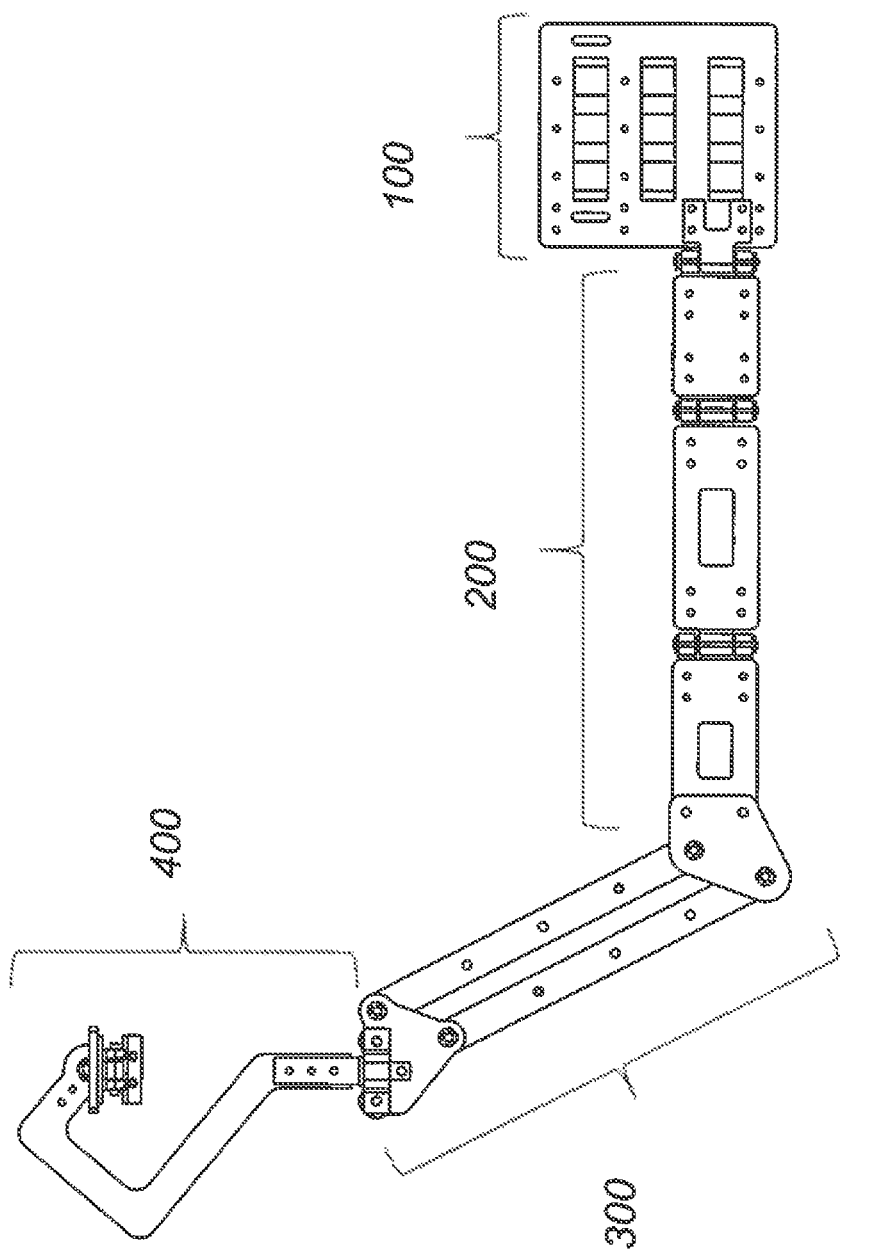

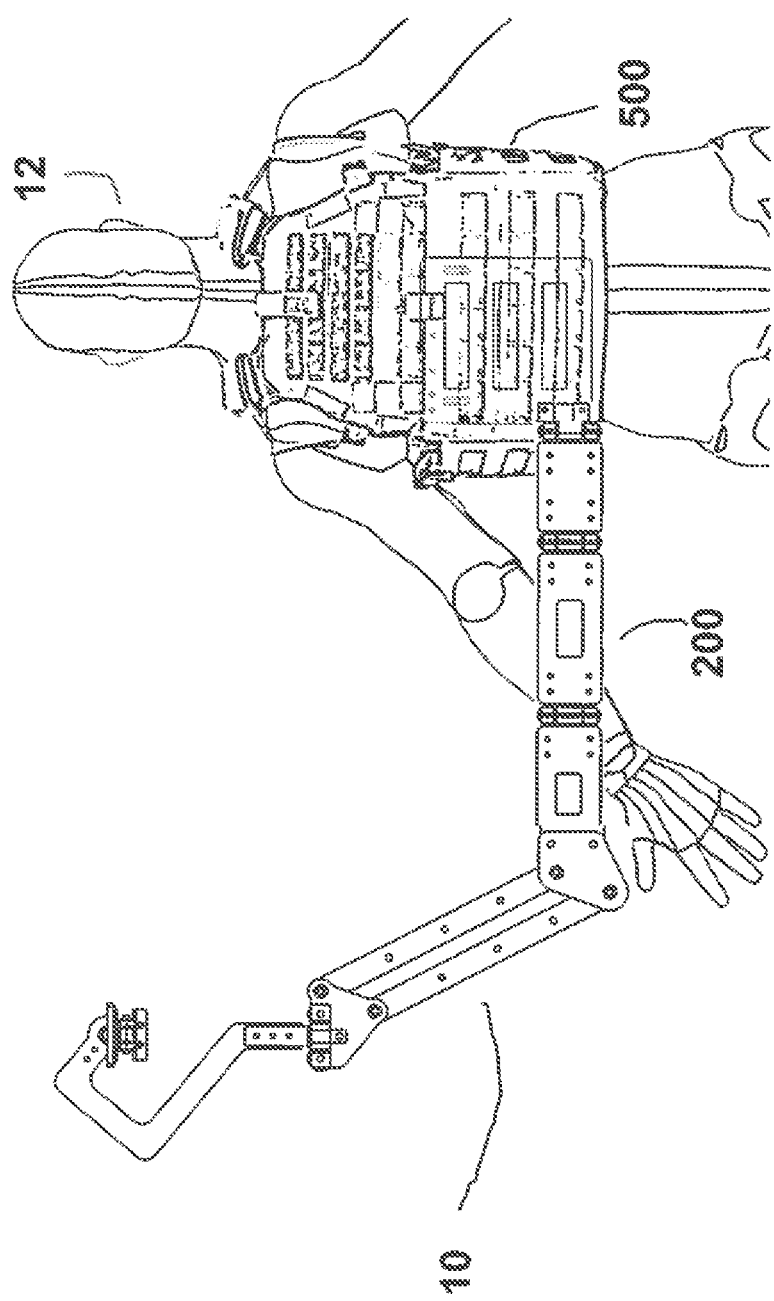

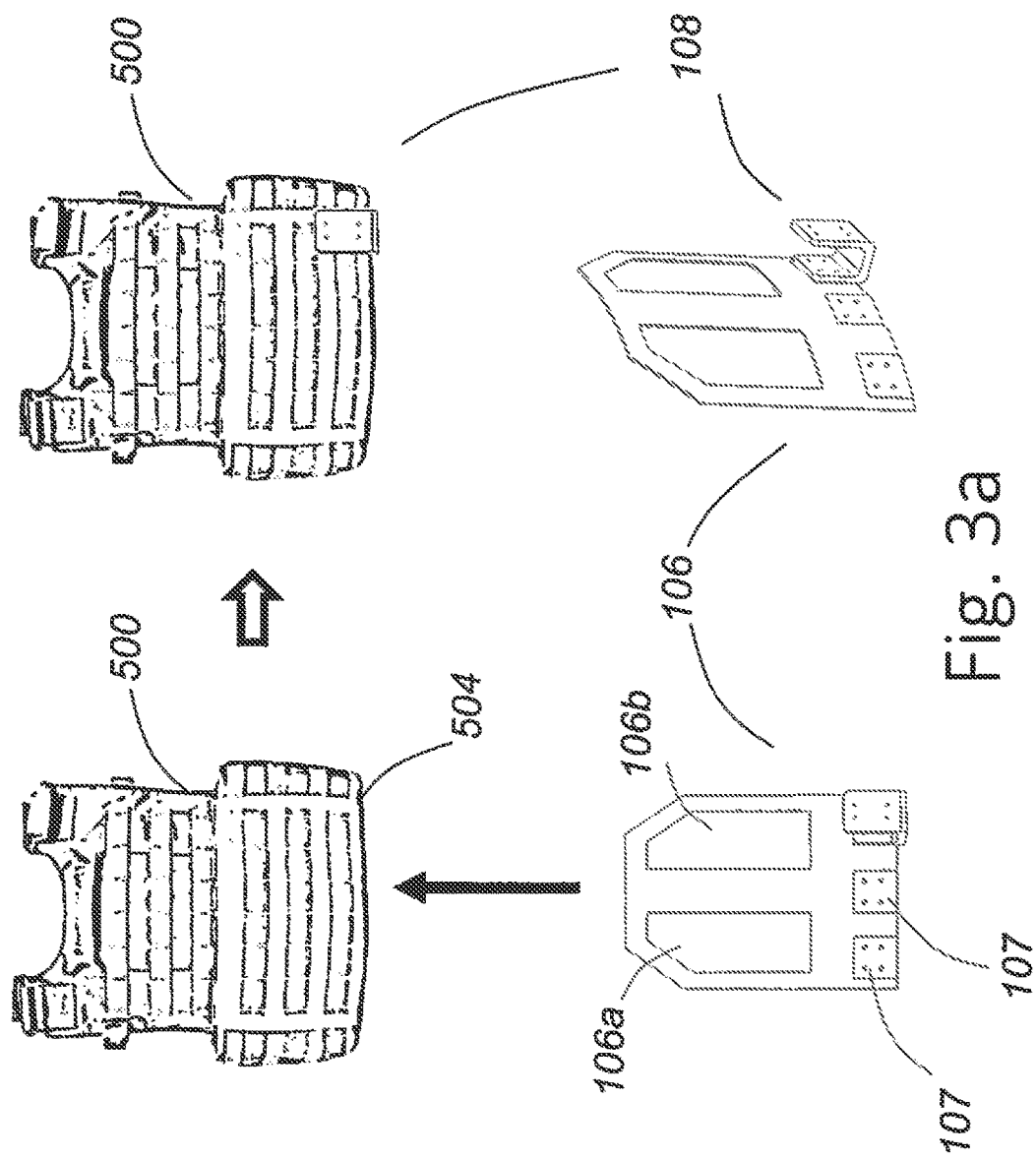

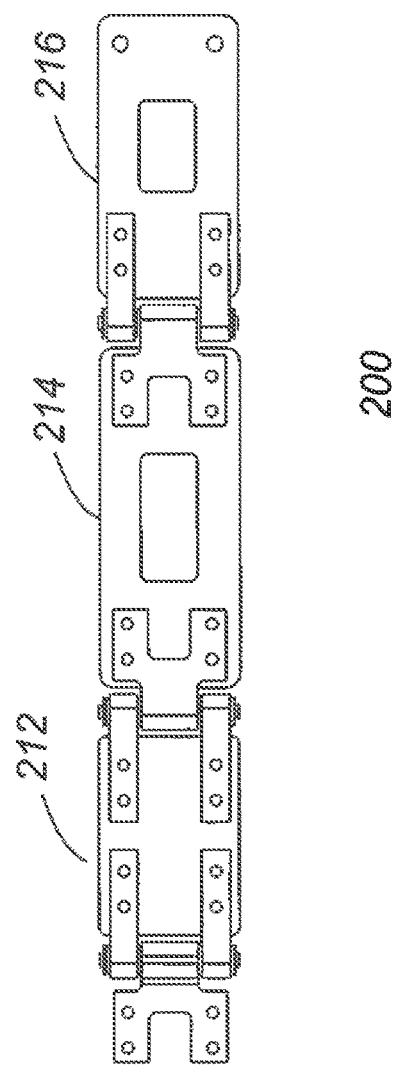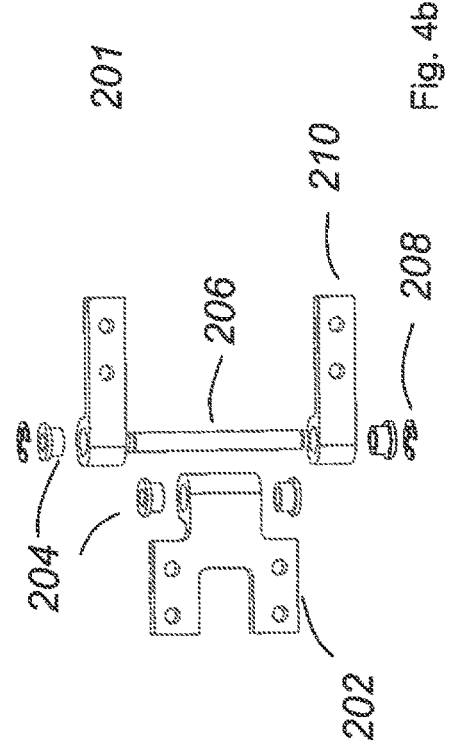

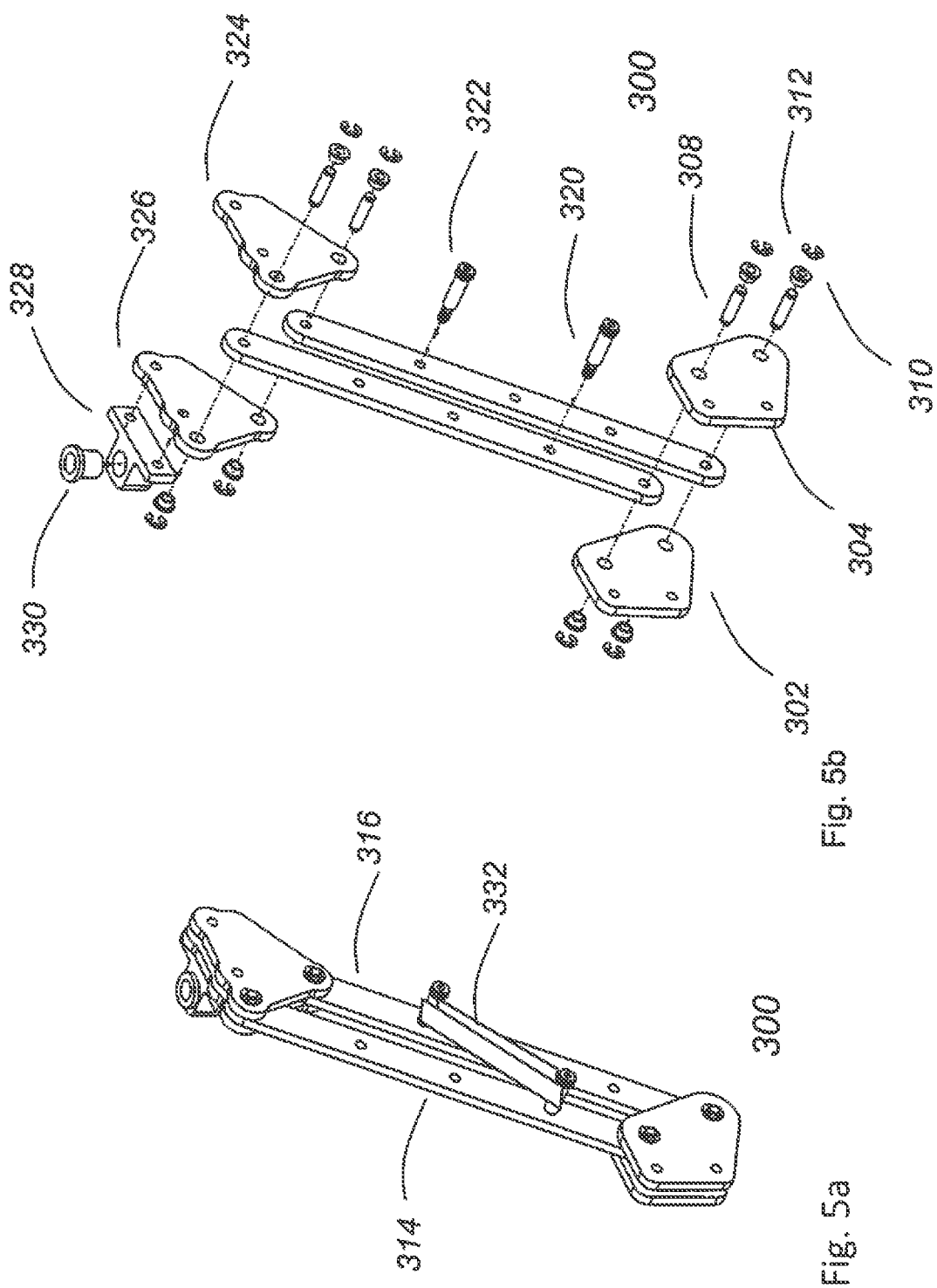

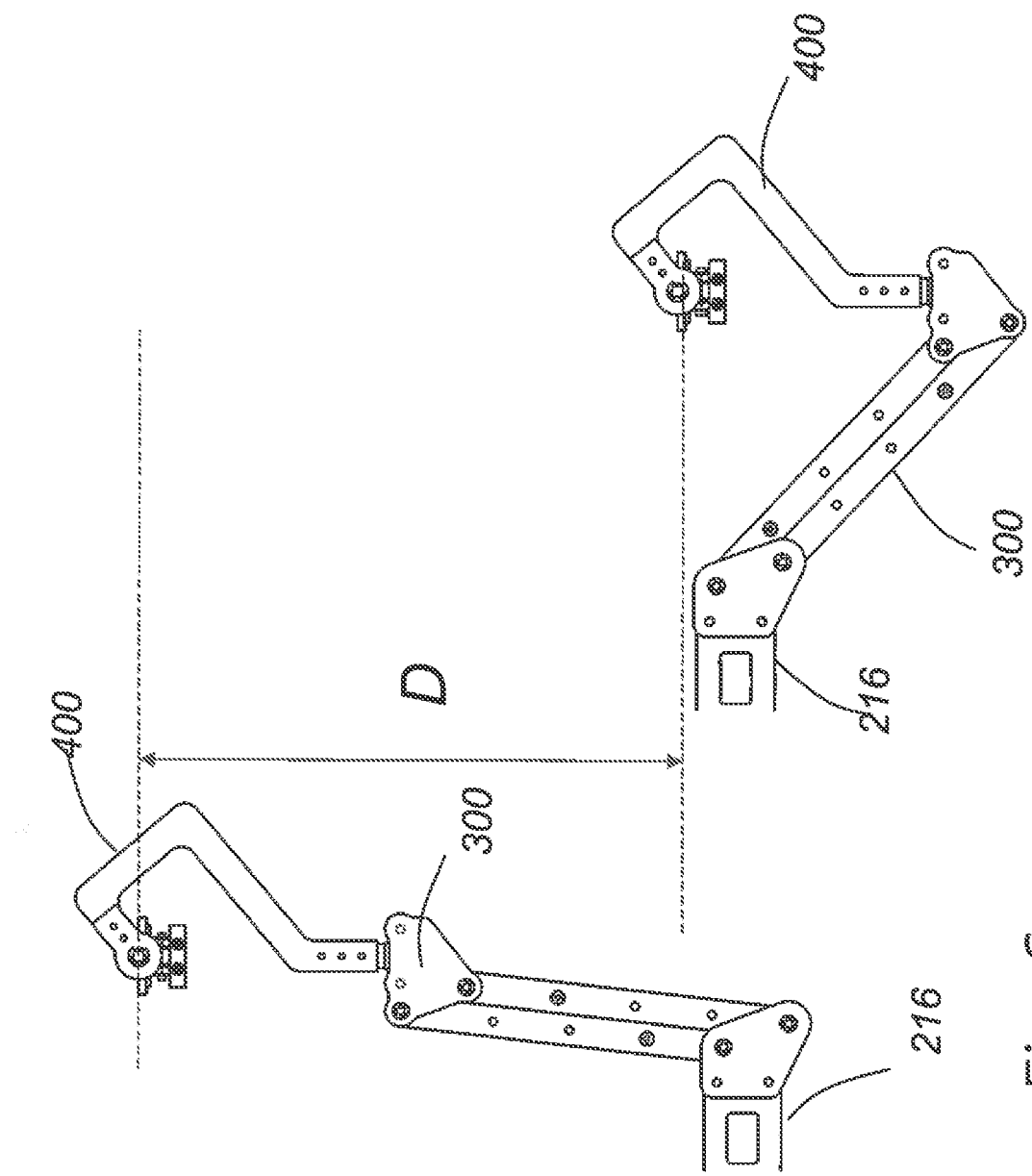

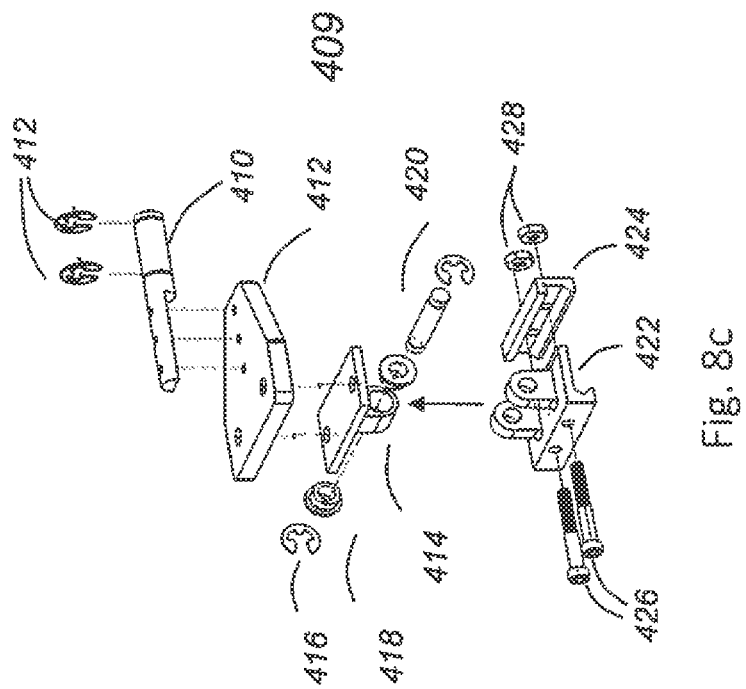
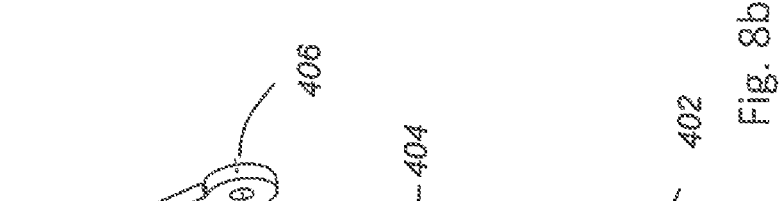
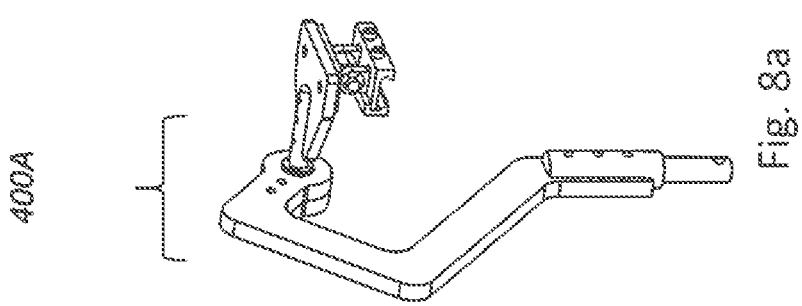

THIRD ARM WEAPON INTERFACE SYSTEM

CROSS-REFERENCE TO RELATED APPLICATIONS

This patent application claims the benefit of U.S. Provisional Patent Application No. 62/516,692 titled "Third Arm Weapon Interface System" filed on Jun. 8, 2017 the entire contents which are hereby incorporated by reference herein including all attachments and other documents that were incorporated by reference in U.S. Provisional Patent Application No. 62/516,692.

GOVERNMENT INTEREST

Governmental Interest—The invention described herein may be manufactured, used and licensed by or for the U.S. Government.

FIELD OF INVENTION

Embodiments of the present invention generally relate to an individual weapon support system and more particularly to a stable wearable for use in conjunction with a conventional weapon.

BACKGROUND

Rifle accuracy for hunters, sport shooters, and Soldiers can generally be improved by stabilizing the weapon. Stabilization is often achieved through use of environmental support, or devices such as a sling, bipod, or shooting sticks. However, slings do not transfer the weight of the weapon off the arms, and bipods and shooting sticks cannot provide stability while a shooter is moving. Carrying weapons for extended periods of time can fatigue the arms, fatigue is a leading cause in the reduction in accuracy. Holding a steady aiming position for just a few minutes while standing can also cause fatigue and tremors in the shooter's arms, quickly reducing accuracy.

The present invention, "Third Arm Weapons Interface", we have developed a novel wearable, passive, mechanical appendage designed to increase accuracy and reduce arm fatigue when using rifles or tools by transferring the weight of the weapon and thus stabilizing and counterbalancing the weight. The Third Arm Weapons Interface may be connected to the front or back of a tactical vest. The interface can be used with the MOLLE webbing system or the PALS system, or to an insert that fits into the armor plate pocket. The interface connects to the Picatinny rail modular system on the firearm, allowing it to work with various weapons or implements which utilize the Picatinny rail system. Our invention allows for a complete stabilization of a weapon or tool by redistributing the weight onto the torso of the user or operator using a unique spring element. Our invention allows the user to carry and handle a wider variety of weapons and tools, as well as one-handed operation of a weapon for unconventional aiming postures. Additionally, our invention provides a framework and pathway to redistribute recoil forces across other parts of the operator's body, not just the shoulder pocket. Our invention, at least in one embodiment, is manufactured primarily using high-strength, lightweight carbon-fiber composite, and in this configuration weighs less than four pounds.

Vest-mounted devices to steady the motion of a camera for cinematography have existed for decades. These devices typically consist of a vest with a rigid element, and an arm with multiple joints which connects to the front of the vest. The arm segments typically consist of a simple 4-bar mechanism with a spring linkage. These types of devices are designed only to work with a proprietary vest, typically have large, heavy spring elements, and have a simple mounting rod on the end of the arm, to connect to camera equipment. These devices have limited degrees of freedom, with additional equipment required to provide the necessary degrees of freedom to operate the camera on the end of the arm. The lengths of the arm segments of these devices cannot be adjusted to fit different users or change the range of motion. Several devices attach camera equipment to a vest via rigid members or cables that go over the shoulder or head of the wearer. While at first blush these devices may appear in some way similar to the present invention it should be noted that they could not be used in the same way and to the same effect as the present invention described and claimed herein. The aforementioned devices cannot provide the necessary range of motion required for conventional weapon use (namely, the prone position), and would inappropriately attach to different rifles in awkward or unusable ways. Furthermore, the cable-suspended approach provides no additional load pathway for mitigating recoil forces the way the present invention does.

The present invention interface features a vest attachment mechanisms that allow it to be used with nearly any tactical or plate carrier vest as in service by the United States military. The hinge assembly and arm segments of the interface are made of lightweight composite materials and are designed to be low-profile, hugging the operator's body when folded in. The interface employs lightweight polymer spring elements to help maintain this low profile. The interface provides all the necessary degrees of freedom for normal operation of a conventional weapon while allowing shooting from the prone position. While there have been passive devices for shooting stabilization they are typically designed to either lock one degree of freedom between the weapon and the wearer, or provide a load pathway from the weapon to the ground or another structure. Our invention is advantageous over these devices as it does not lock or restrict weapon motion, and does not need to be steadied on the ground or another structure, allowing it to be used on the move.

Our invention also provides a new direction for Soldier weapon design. By providing an additional "appendage" to hold the rifle and distribute recoil forces, future weapons can be skeletonized to the minimal components needed for core functionality (eliminating butt stocks, fore grips, and mechanical sights, e.g.). This has the benefit of substantially reducing the weight of the notional Third Arm-weapon system.

SUMMARY

Embodiments of the present provide a wearable apparatus for stabilization of a firearm. In one embodiment the wearable apparatus consists of a plate that slides into a tactical vest, a hinge assembly, a four-bar linkage with a spring to balance the weight of the firearm, and a firearm attachment assembly. Together, these assemblies comprise a novel apparatus that improves accuracy for a wide variety of firearms, reduces arm fatigue, is adjustable for different user body sizes, and enables a wider range of motion with the firearm than existing firearm stabilizing devices.

Other and further embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1a is a left side elevation view of the present invention;

FIG. 2b is a front elevation of one embodiment of the present invention;

FIG. 3a is a rear elevation of one embodiment of a vest attachment system of the present invention;

FIG. 4a is a plan view of the flexible hinge assembly of one embodiment of the present invention;

FIG. 4b is an exploded view of hinge link of one embodiment of the present invention;

FIG. 5a is a perspective view of the four bar linkage in accordance with at least one embodiment of the present invention;

FIG. 5b is an exploded view of the four bar linkage in accordance with at least one embodiment of the present invention;

FIG. 6a is a partial side view showing two different positions in accordance with at least one embodiment of the present invention;

FIG. 8a-8c are perspective and exploded views of the Q-arm assembly in accordance with at least one embodiment of the present invention.

DETAILED DESCRIPTION

Figure 1B:
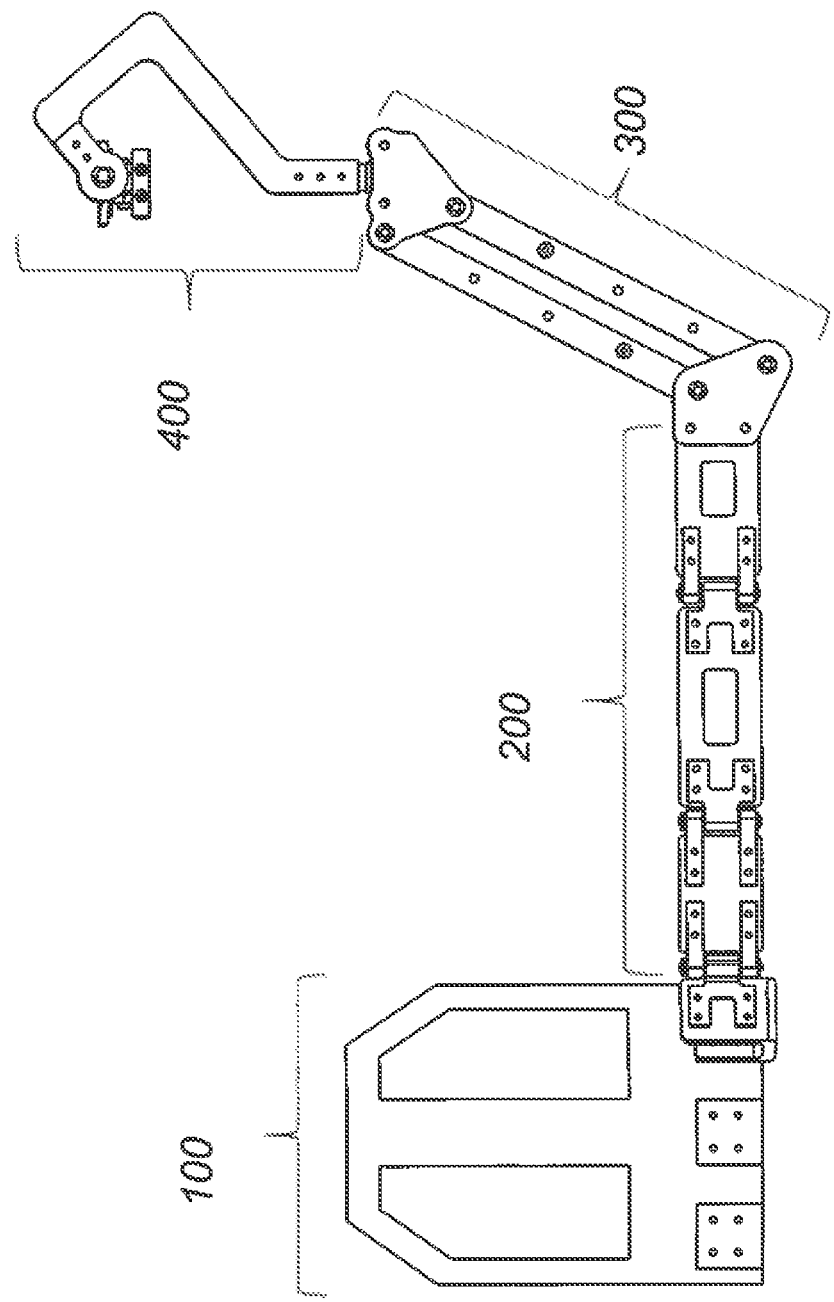
FIG. 1b is a right side elevation of the present invention.
Figure 2A:
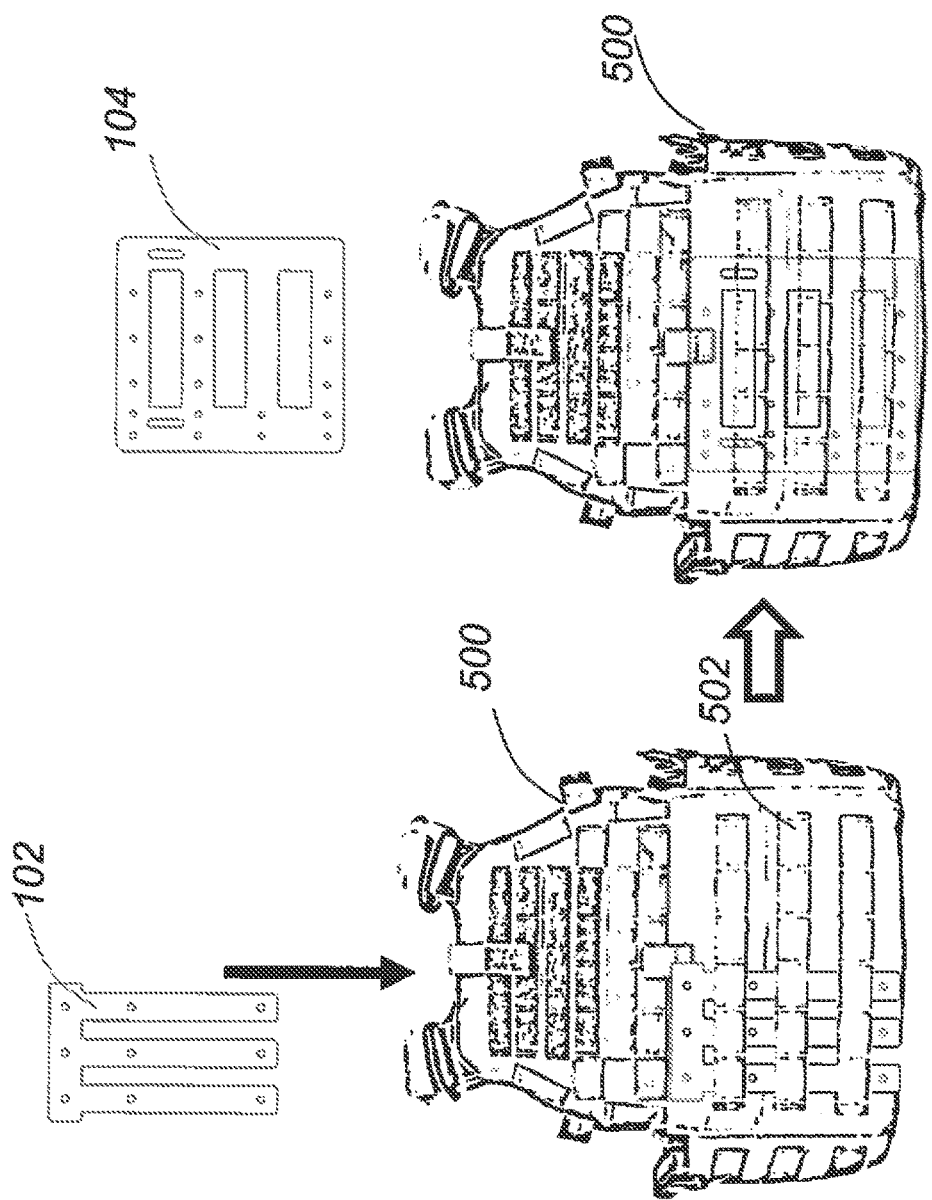
FIG. 2a is a front elevation of one embodiment of a vest attachment system of the present invention.

The Third Arm Weapon Interface System 10 consists of four primary sub-assemblies, referring to FIG. 1a and FIG. 1b, we note the vest attachment 100, the hinge assembly 200, a four-bar linkage assembly 300, and the implement attachment assembly 400. In one embodiment, the vest attachment assembly 100 is comprised of a finger plate 102, see FIG. 2a that slides through multiple loops of the PALS (Pouch Attachment Ladder System) webbing 502 on the front or the back of a tactical vest 500 (FIG. 2). A face plate 104 bolts to the finger plate 102 in multiple locations so as to clamp onto the PALS webbing 502 and prevent the finger plate 102 from sliding out of the webbing 502. The vest attachment plates 102 and 104 allow for relatively easy attachment and positioning of Third Arm Weapon Interface System 10 on the left side, right side, or center of different types of vests 500. However, not all tactical vests feature sufficient PALS webbing for attachment, or other features of the vest may preclude attachment to the PALS webbing, or attachment to the PALS webbing may not be desirable.

FIG. 2b shows the system 10 attached to a vest 500 and fully extended via the flexible hinge assembly 200 to the users 12 right hand side.

In another embodiment as shown in FIG. 3a, a pocket plate 106 slides into the back or front of a vest 500 (note arrow) armor plate pocket 504. Pocket plate 106 is curved in the same shape as the vest's 500 standard armor plate (not shown), and is in direct contact with the armor plate (not shown) inside the vest's armor plate pocket 504. A U-shaped bracket 108 connects to the pocket plate 106 using standard fasteners (not shown), and extends outside of the armor plate pocket 504 in order to allow connection to the hinge assembly 200. The pocket plate 106 contains attachment points 107 on the left and right sides of the plate 106, to allow attachment of the U bracket 108 on either side, for left-handed or right-handed use of Third Arm Weapon Interface System 10.

Figure 3B:
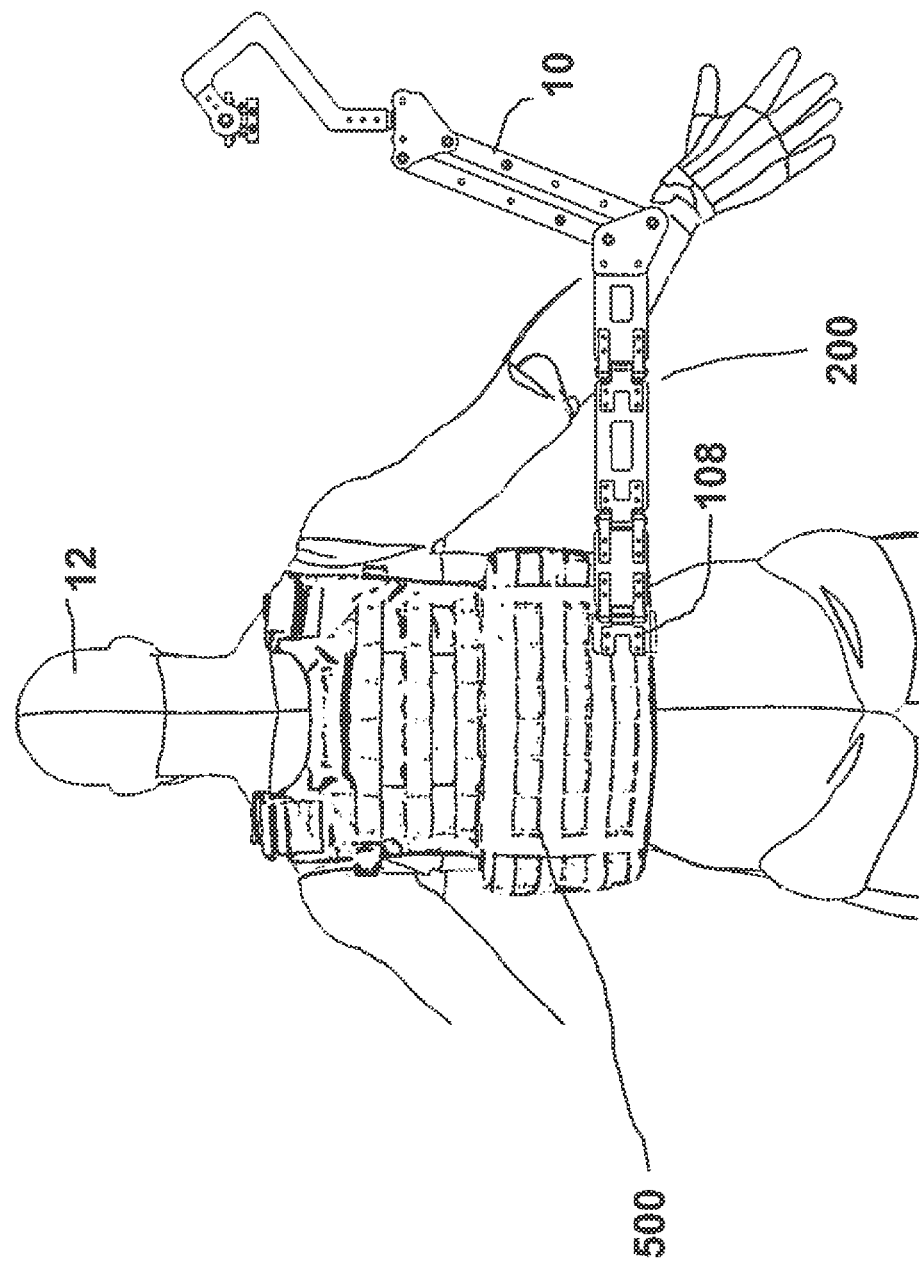
FIG. 3b is a rear elevation of one embodiment of the present invention.

FIG. 3b shows the system 10 attached to the back of a vest 500 via u-shaped bracket 108 and fully extended via the flexible hinge assembly 200 to the users right hand side.

Referring to FIGS. 4a and 4b the hinge assembly 200 is comprised of at least two or more hinge plates 212, 214, and 216 respectively in cooperation with each other via a plurality of flexible hinge assembly 201 depicted in FIG. 4b. Hinge assembly 201 is comprised of hinge tabs 202 and 210 connected via a hinge pin 206 and riding on bushings 204. The entire assembly is secured via e-clips 208 disposed upon said hinge pin 206. In an alternative embodiment (not shown) inventors contemplate hinge tabs 202 and 210 being molded into hinge plates 212, 214 and 216 to save weight. The assembly 200 is designed to allow nearly 360 degrees of rotation in order to allow the system 10 to fold into a small compact space for storage on the back of the vest 500. The hinge plates 212, 214 and 216 can be interchanged with other hinge plates of differing lengths to fit the size of a specific individual user. The system 10 can also be switched to left or right hand sides to facilitate left or right hand users.

Referring to FIGS. 5a and 5b the four bar linkage assembly 300 is formed by lower swing plates 302 and 304 connecting to two scissor arms 314 and top swing plates 324 and 326 respectively. Swing plates 302, 304, 324, and 326 are connected to scissor arms 314 and 316 via pins 308 which rotate in sleeve bearings 310 and are secured via e-clips 312. The four bar linkage assembly 300 is designed such that top swing plates 324 and 326, pintle mount 328, and sleeve bearing 330 all stay in the same orientation as they rotate about bottom swing plate 302 and 304.

Figure 6B:
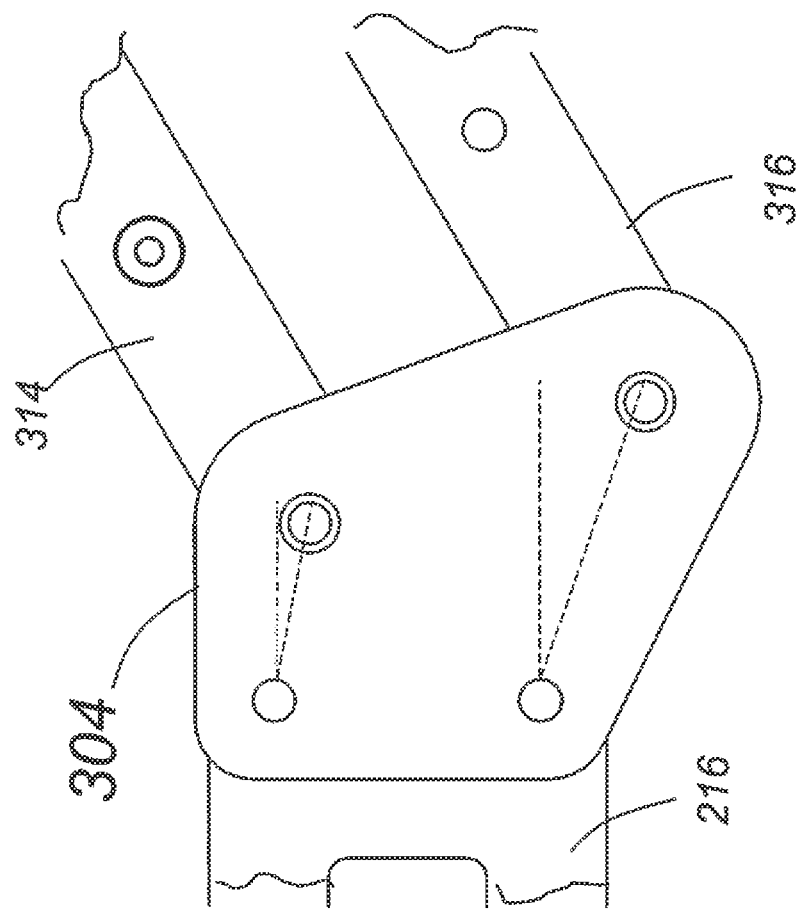
FIG. 6b is a partial side view of a lower swing plate in accordance with at least one embodiment of the present invention.

Aperture placement on bottom swing plates 302 and 304 are designed to allow for a large range of vertical motion as depicted in FIG. 6a. In FIG. 6a we note "D" as denoting the range or distance of vertical motion. Close up detail of lower swing plate 304 is shown in FIG. 6b wherein the offset angle of the apertures, depicted as dashed lines, allows for the unique range of motion of the scissor arms 314 and 316. Additionally, the aperture pattern of bottom swing plates 302 and 304 keep scissor arms 314 and 316 from becoming completely vertical which creates a dead spot, a condition that makes it difficult to move the implement (not shown) out of.

Figures 7A, 7B, 7C, 7D:
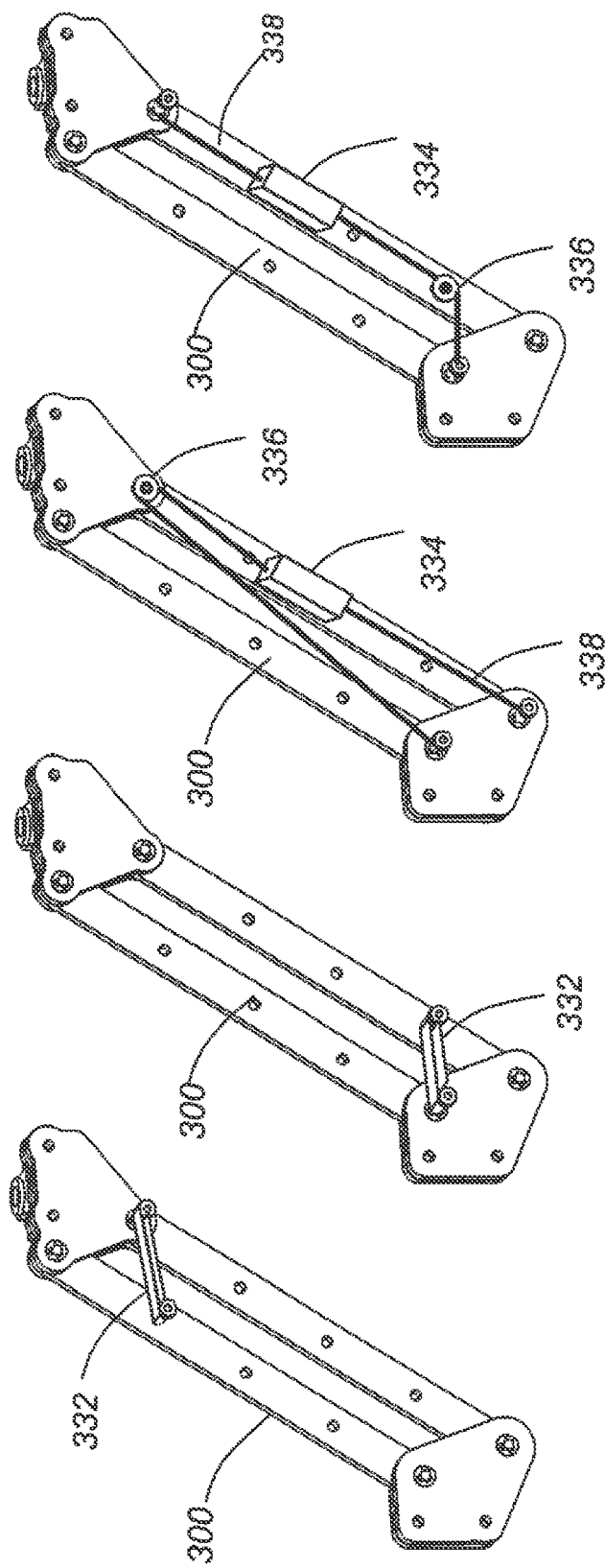
FIG. 7a-7d is a perspective view of a plurality of four bar linkage embodiments in accordance with the present invention.

FIG. 7a-7d depicts a several embodiments of a resilient means for counteracting the weight of an implement (not shown). FIG. 7a shows an elastic element 332 affixed to shoulder bolts 320 and 322, which are fastened to apertures of scissor arms 314 and 316 respectively. Various arrangements for the location of the resilient means are shown and it is notable that spring elements may be routed via pulley 336 as shown in FIG. 7c and FIG. 7d such that the balancing force becomes independent of the spring extension. Elastic element 332 is sized and positioned to counteract the weight of the desired implement (not shown). In one embodiment the elastic element 332 is a latex band (FIG. 7a and FIG. 7b) while in other embodiments the resilient means is depicted as a coil spring, FIGS. 7c and 7d. Other embodiments contemplated by the inventors but not shown include and are not limited to composite springs, gas springs, artificial muscle tissue and solenoids.

Show in FIG. 8a-8c depicts the implement attachment assembly 400 in great detail. FIG. 8a shows the assembly 400 assembled in 3d perspective view while FIG. 8b shows an exploded view of the Q-arm 400B and its elements while FIG. 8c depicts an exploded view of the implement attachment point 409. In the present embodiment, the implement attachment assembly 400 is designed to attach a rifle (not shown) via a Picatinny rail that is on top of conventional military rifles. A pintle mount 328 (see FIG. 5b) with a sleeve bearing 330 (see FIG. 5b) attaches to the top swing plate 326 of the four-bar linkage assembly 300. A pintle shaft 402 passes through the sleeve bearing 330 and attaches to the Q-arm 404, see FIG. 8b. This pintle connection allows one rotational degree of freedom through the long axis of the pintle shaft 402. The Q-arm 404 is shaped to avoid interference between ejected cartridges (not shown) and the Q-arm 404. The distal end of the Q-arm 404 contains a sleeve bearing 408, through which a horizontal shaft 410 passes. This shaft connection allows an additional rotational degrees of freedom through the long axis of the shaft 410, perpendicular to the previous rotational degrees of freedom. Implement connector plate 412 is fastened to horizontal shaft 410, and a rail hinge top plate 414 is fastened to implement connector plate 412, see FIG. 8c.

In another embodiment, implement connector plate and rail hinge top plate could be one machined piece, to save weight, size, and complexity. Rail hinge assembly 400B allows for a third rotational degrees of freedom about pin 420, perpendicular to both previous rotational degrees of freedom of the rifle attachment assembly. Pin 420 could be a quick-release pin to allow rapid, one-handed removal of the weapon from the rest of the assembly 400. The rail hinge assembly 400B is designed to be low-profile so as to not impede aiming of the rifle, while still allowing the necessary rotational degrees of freedom.

Figures 9A, 9B:
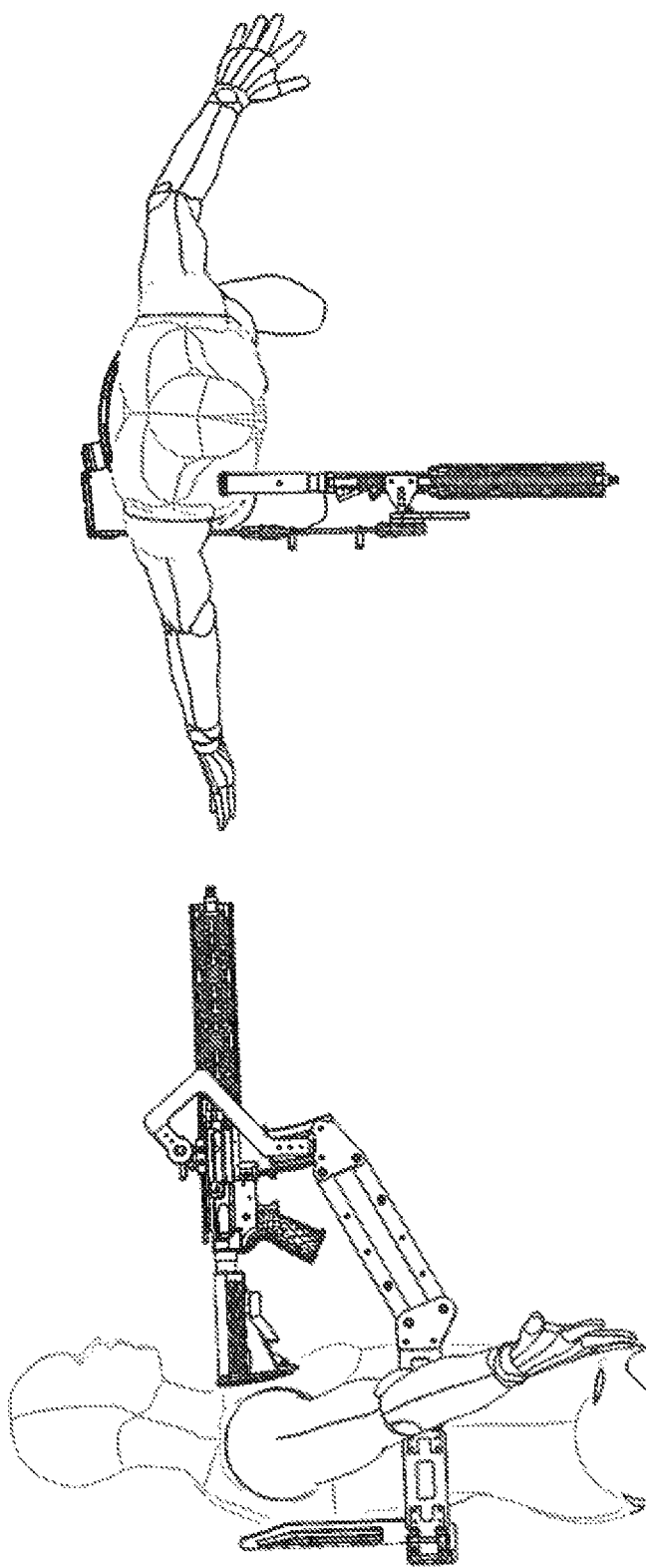
FIG. 9a-9b are side and top views respectively of at least one embodiment of present invention in use.

In other embodiments, the implement attachment assembly could consist of different components to allow different degrees of freedom and attach to different implements, including but not limited to breaching tools (such as a power circular saw) and shields. An embodiment for rifle use can be seen in FIGS. 9a and 9b, shown without the tactical vest.

While the foregoing is directed to embodiments of the present invention, other and further embodiments of the invention may be devised without departing from the basic scope thereof.

We claim:

1. A wearable weapon stabilization apparatus system especially designed for soldiers, hunters and shooters to use while moving and with single hand operation capable of providing a lightweight stable weapons platform that has minimized operator fatigue and increases accuracy by redirecting the weapons weight from the operators arms to the operators torso that comprises;

a body armor vest attachment means disposed between a body armor vest and a flexible hinge support assembly means that is in communication with said hinge assembly means, said vest attachment means also being in communication with a body armor vest, a flexible hinge support assembly having at least one hinge means and being disposed between said vest attachment means and a four bar linkage assembly wherein said hinge means provides a flexible linkage and maintains an attitude while allowing flexure of said hinge means within the plane of said hinge means, a four bar linkage assembly disposed between said flexible hinge support means and said weapon and provides vertical movement support and flexibility having a consistent force means required to change the position of the weapon in the vertical movement plane, and an implement attachment means that is disposed between the weapon and the four bar linkage, said implement attachment means configured to affix an implement and allow movement in a plurality of directions while being rotatably affixed to said four bar linkage.

2. A wearable weapons stabilization apparatus system of claim 1 wherein said vest attachment is a finger plate interface to a pouch attachment ladder system (PALS).

3. A wearable weapons stabilization apparatus system of claim 1 wherein said vest attachment is a plate that slides inside a body armor vest.

4. A wearable weapons stabilization apparatus system of claim 3 wherein said vest attachment is a plate with a u-bracket that connects to a thickness portion of the vest.

5. A wearable weapons stabilization apparatus system of claim 1 wherein said four bar mechanism is further comprised of parallel arms.

6. A wearable weapons stabilization apparatus system of claim 1 wherein said hinge assembly comprises a series of interchangeable linked sections whereby said sections can be replaced based on individual user fit.

7. A wearable weapons stabilization apparatus system of claim 6 wherein at least one of said linked sections is adjustable.

8. A wearable weapons stabilization apparatus system of claim 1 wherein said implement attachment is a rotatably affixed Q-arm.

9. A wearable weapons stabilization apparatus system of claim 1 wherein said implement attachment further comprises a series of end points that facilitate various and sundry tool and conventional weapons.

10. A wearable weapons stabilization apparatus system of claim 8 wherein said Q-arm further comprises a rotatably pivoting clamp to removably affix to a Picatinny rail.

11. A wearable weapons stabilization apparatus system of claim 1 wherein said consistent force means comprises elastic bands disposed on and connecting the arms of the four bar linkage.

12. A wearable weapons stabilization apparatus system of claim 1 wherein said consistent force means comprises an extension spring disposed on and connecting the arms of the four bar linkage.

13. A third arm interface apparatus and system designed to reduce arm fatigue caused by carrying a weapon and facilitate accurate shooting by providing a stable platform that comprises;

a body armor vest attachment that is removably affixed to a body armor style vest and affixed to at least one flexible hinge, said flexible hinge being flexibly connected to a four bar linkage assembly and oriented to provide movement through a horizontal plane, said four bar linkage assembly being disposed between and connected to said flexible hinge, and an implement attachment oriented to provide movement through a vertical plane, said implement attachment being disposed between and connected to said four bar linkage and an implement.

14. A third arm interface apparatus and system designed to reduce arm fatigue caused by carrying a weapon and facilitate accurate shooting by providing a stable platform of claim 13 wherein said implement is a weapon.

15. A third arm interface apparatus and system designed to reduce arm fatigue caused by carrying a weapon and facilitate accurate shooting by providing a stable platform of claim 13 wherein said implement is a shield.

16. A third arm interface apparatus and system designed to reduce arm fatigue caused by carrying a weapon and facilitate accurate shooting by providing a stable platform of claim 13 wherein said four bar linkage assembly further comprises a resilient means that provides consistent counteractive force insuring smooth elevation and depression of the implement attachment through a vertical plane.

17. A third arm interface apparatus and system designed to reduce arm fatigue caused by carrying a weapon and facilitate accurate shooting by providing a stable platform of claim 16 wherein said resilient means further comprises at least one elastic band in communication with the four bar linkage.

18. A third arm interface apparatus and system designed to reduce arm fatigue caused by carrying a weapon and facilitate accurate shooting by providing a stable platform of claim 16 wherein said resilient means further comprises at least one extension spring in communication with the four bar linkage.

19. A third arm interface apparatus and system designed to reduce arm fatigue caused by carrying a weapon and facilitate accurate shooting by providing a stable platform of claim 13 wherein said flexible hinge further comprises a plurality of links that are hingedly affixed to each other.

20. A third arm interface apparatus and system designed to reduce arm fatigue caused by carrying a weapon and facilitate accurate shooting by providing a stable platform of claim 13 wherein said flexible hinge further comprises a solid flexible member.

* * * * *